US012171050B2

(12) United States Patent
Lan et al.

(10) Patent No.: US 12,171,050 B2
(45) Date of Patent: Dec. 17, 2024

(54) POWER REGULATING DEVICE AND LIGHT

(71) Applicant: Shenzhen Guanke Technologies Co., Ltd, Shenzhen (CN)

(72) Inventors: Qing Lan, Shenzhen (CN); Shoubao Chen, Shenzhen (CN); Bo Lei, Shenzhen (CN); Jinliang Lei, Shenzhen (CN)

(73) Assignee: SHENZHEN GUANKE TECHNOLOGIES CO., LTD, Shenzhen (CN)

( * ) Notice: Subject to any disclaimer, the term of this patent is extended or adjusted under 35 U.S.C. 154(b) by 327 days.

(21) Appl. No.: 17/570,996

(22) Filed: Jan. 7, 2022

(65) Prior Publication Data

US 2023/0147508 A1 May 11, 2023

(30) Foreign Application Priority Data

Nov. 8, 2021 (CN) ......................... 202122721563.8

(51) Int. Cl.
*H05B 45/30* (2020.01)
*H05B 45/10* (2020.01)
*H05B 47/10* (2020.01)

(52) U.S. Cl.
CPC ............ *H05B 45/30* (2020.01); *H05B 45/10* (2020.01); *H05B 47/10* (2020.01)

(58) Field of Classification Search
CPC ......... H05B 45/30; H05B 45/10; H05B 47/10
See application file for complete search history.

(56) References Cited

U.S. PATENT DOCUMENTS

2014/0049963 A1* 2/2014 McGuire ................. F21K 9/232
362/382
2018/0035510 A1* 2/2018 Doheny ................. H05B 45/30
2019/0297784 A1* 10/2019 Hegde .................... A01G 7/045
2019/0335552 A1* 10/2019 Iqbal ...................... H05B 45/10

* cited by examiner

*Primary Examiner* — Minh D A
(74) *Attorney, Agent, or Firm* — Maier & Maier, PLLC

(57) ABSTRACT

A power regulating device and light. The power regulating device includes a mounting base provided on the light; the mounting base provided with a mounting space; variable resistance provided inside the mounting space and electrically connecting to the control power supply of the light; control switch provided inside the mounting space and electrically connecting to the control power supply of the light; regulating part, connecting to the mounting base in a flexible way and provided with the first regulating section and the second regulating section; the first regulating section connecting to the variable resistance, the second regulating section enabling switch of the state of the control switch; compared with existing technology, the light power regulating device provided with the first regulating section and the second regulating section can realize both the continuous power regulating mode and the precise power regulating mode at the same time.

18 Claims, 15 Drawing Sheets

POWER REGULATING DEVICE AND LIGHT

TECHNICAL FIELD

The present invention relates to the technical field of lighting equipment, particularly to a power regulating device.

Background Power regulating of lights is usually realized with a dedicated dimmer, such as 0-10V dimmer, controllable silicon dimmer, etc. Such dimmers are usually independent from the light, and the specification of the dimmer should match the specification of the driving power supply inside the light, so that the dimmer can be used. The operation of such application is complex. Also, when the specification of the dimmer does not match that of the driving power supply, the circuit is easy to burn out, and accidents will occur. Additionally, existing lights usually apply continuous power regulating which is hard to realize precise dimming of specific power and affects the service effect.

The foregoing content is only used for assisting in understanding the technical scheme of the present invention, but does not mean the acknowledgement that the above content is the prior art.

SUMMARY

To solve the above problem, the present invention provides a power regulating device and light that can realize both continuous dimming and precise dimming to realize composite dimming of the light.

To realize the above purpose, the power regulating device of the present invention comprises:

Amounting base provided on the light; the mounting base provided with a mounting space;

Variable resistance provided inside the mounting space and electrically connecting to the control power supply of the light;

A control switch provided in the mounting base and electrically connecting the control power supply of the light;

Regulating part, connecting to the mounting base in a flexible way and provided with the first regulating section and the second regulating section; the first regulating section connecting to the variable resistance, the second regulating section enabling switch of the state of the control switch; when the regulating part rotates or slides corresponding to the mounting base, the resistance value of the variable resistance can be changed, or the state of the control switch can be switched; when the state of the control switch is switched, the control power supply outputs the corresponding specific power according to the control switch, i.e. the precise dimming power; when the state of the control switch is not switched, the control power supply outputs corresponding power according to the resistance value of the variable resistance, i.e. the continuous dimming power. Other characteristics and corresponding beneficial effects of the present invention are elaborated in the latter part of the description.

The solving ideas of technical problems of the present invention and relevant product design solutions are as shown below:

Taking the light with the maximum power of 63 W as an example, the light body is provided with a power regulating device. The power regulating device comprises a rotatable regulating part, a potentiometer, at least one control switch and one control power supply. The regulating part comprises the first regulating section and the second regulating section.

The first regulating section connects to the potentiometer (variable resistance RT1), and can change the resistance value of the potentiometer during rotation of the regulating part to generate continuously changing first control signals, enabling the control power supply to realize corresponding continuous power output. During rotation of the regulating part, the second regulating section can gradually start one or multiple control switch/es to change the state of the control switch and generate specific second control signals, enabling the control power supply to realize specific precise power output [in the embodiment, the control switch can be normally open, when the second regulating section contacts the control switch, the switch will be turned off to send the second control signals to the control power supply; when the second regulating section does not contact the control switch, the switch will be turned off automatically, so that the second control signals will not be sent]. For example, when the second regulating section rotates to the first control switch SW1, one second control signal enabling output of 36 W power will be sent to the control power supply, when the second regulating section rotates to and contacts the second control switch SW2, another second control signal enabling output of 54 W power will be sent to the control power supply (FIG. 14). The control power supply gives priority to handling of the second control signal, that is, when the first regulating section and the second regulating section send control power supply to the first control signal and the second control signal respectively at the same time, the control power supply will output the corresponding power according to the second control signal, and the first control signal is invalid in such a case, so that it is guaranteed that the control power supply can output specific power precisely. When the control power supply only receives the first control signal, the control power supply outputs continuous dimming power. In other embodiments, the rotation design scheme of the regulating part can be changed into the slide design scheme. The new scheme has the following strengths:

(1) The dimming device enables both the continuous dimming and precise dimming, achieving good service effects.

(2) This can avoid hidden safety hazards arising from mismatch between the dimmer and the light power supply and improve the operation safety during dimming of the light.

(3) Multiple specific power points for precise dimming can be added, the power regulating precision is high, and the working stability of lights can be improved.

(4) This facilitates unification of the light specification. Users only need to buy one specification of products. By regulating the dimming device manually, the power demands of different lighting scenes can be met. Users can freely select brighter or more energy-saving working models according to personal likes. No matter the light is supplied with electricity, the power can be adjusted, enabling convenient and safe operation.

Figure 1:
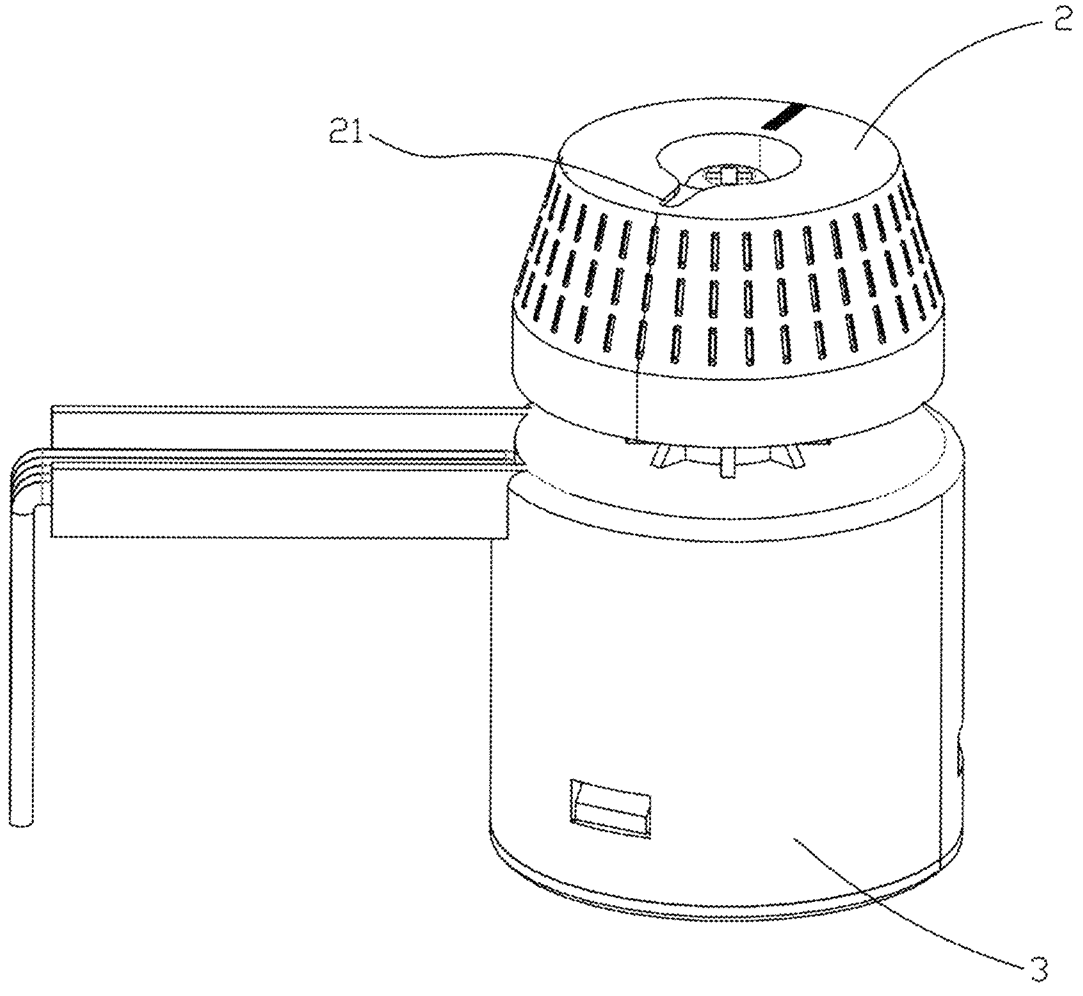
FIG. 1 is a schematic diagram showing the structure of an embodiment of the power regulating device of the present invention.
Figure 2:
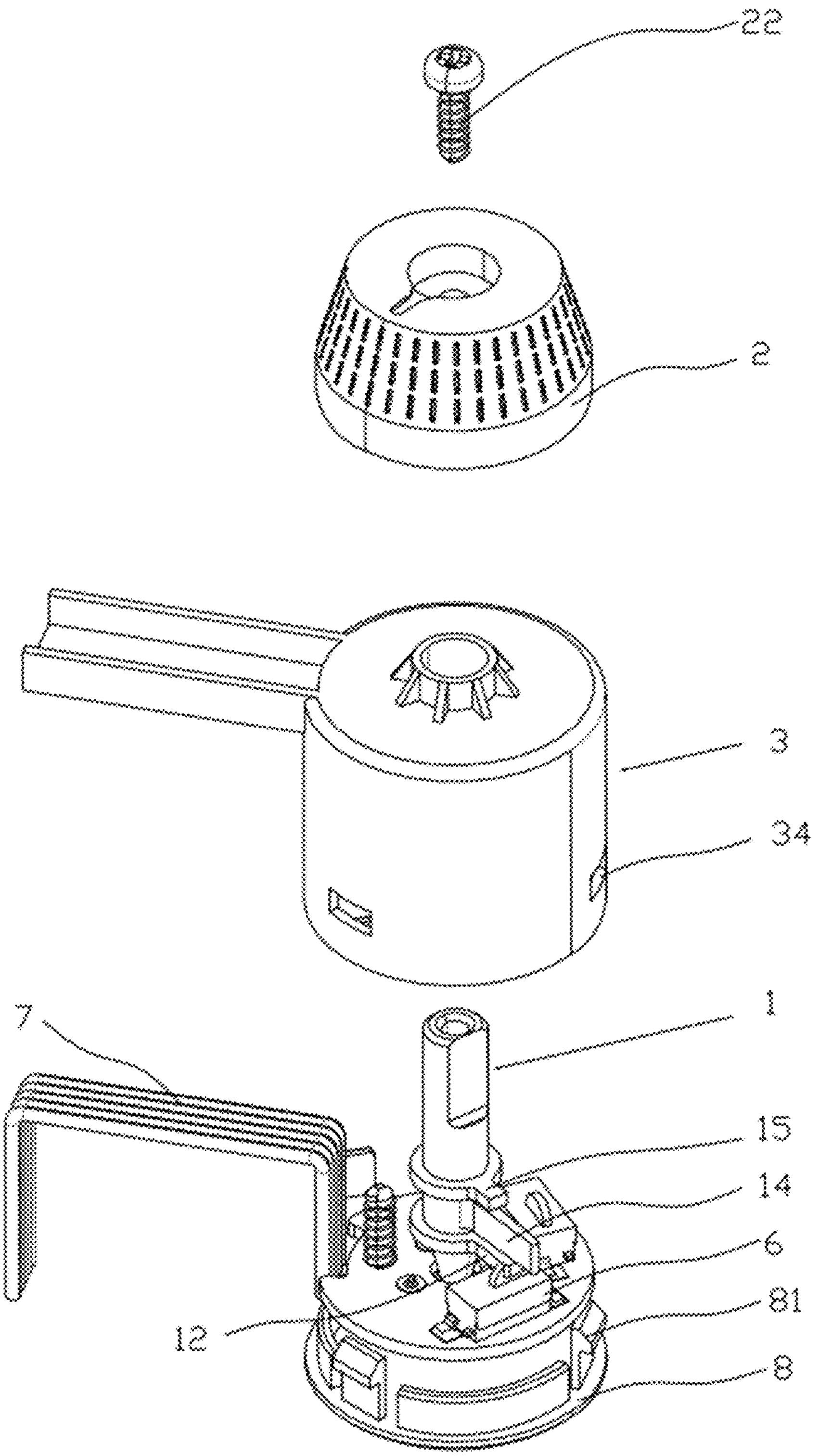
FIG. 2 is a breakdown drawing showing the structure of the power regulating device in FIG. 1.

Notes: In the schematic diagram of the circuit, U1 is the main control chip, U2 is the sub-control chip, SW1 is the first control switch, SW2 is the second control switch, RT1 is the variable resistance, the definition of other sign numbers and names is shown in the content of the concrete embodiment.

The shape, dimension, proportion or position relationship of parts of the product in drawings may be real data of embodiments and they are under protection of the present invention.

DETAILED DESCRIPTION

To make the objective, technical solutions and advantages of the present invention clearer and be understood better, further detailed descriptions of embodiments of the present invention are made in combination with drawings. Understandably, the specific embodiments described are just used to explain but not limit the present invention.

The present invention provides a power regulating device for regulating the power of lights. As shown in FIG. 1-FIG. 5, FIG. 11 and FIG. 14, the power regulating device comprises a mounting base 3, a regulating part 1, a variable resistance 5 and at least a control switch 6. The mounting base is provided on the light body 20 of the light; the inside of the mounting base 3 is provided with a mounting space 31; the variable resistance 5 is provided inside the mounting space 31 and electrically connects to the control power supply 9 of the light; the control switch 6 is provided inside the mounting space 31 and electrically connects to the control power supply 9 of the light; the regulating part 1 flexibly connects to the mounting base 3, the regulating part 1 is provided with the first regulating section 11 and the second regulating section 12; the first regulating section 11 connects to the variable resistance 5, the second regulating section 12 can switch the state of the control switch 6.

The regulating part 1 can rotate or slide corresponding to the mounting base 3 to change the resistance value of the variable resistance 5 and switch the state of the control switch 6. when the state of the control switch 6 is switched, the control power supply 9 outputs the corresponding specific power according to the control switch 6; when the state of the control switch 6 is not switched, the control power supply 9 can output corresponding continuously changing power according to the resistance value of the variable resistance 5.

Figure 3:
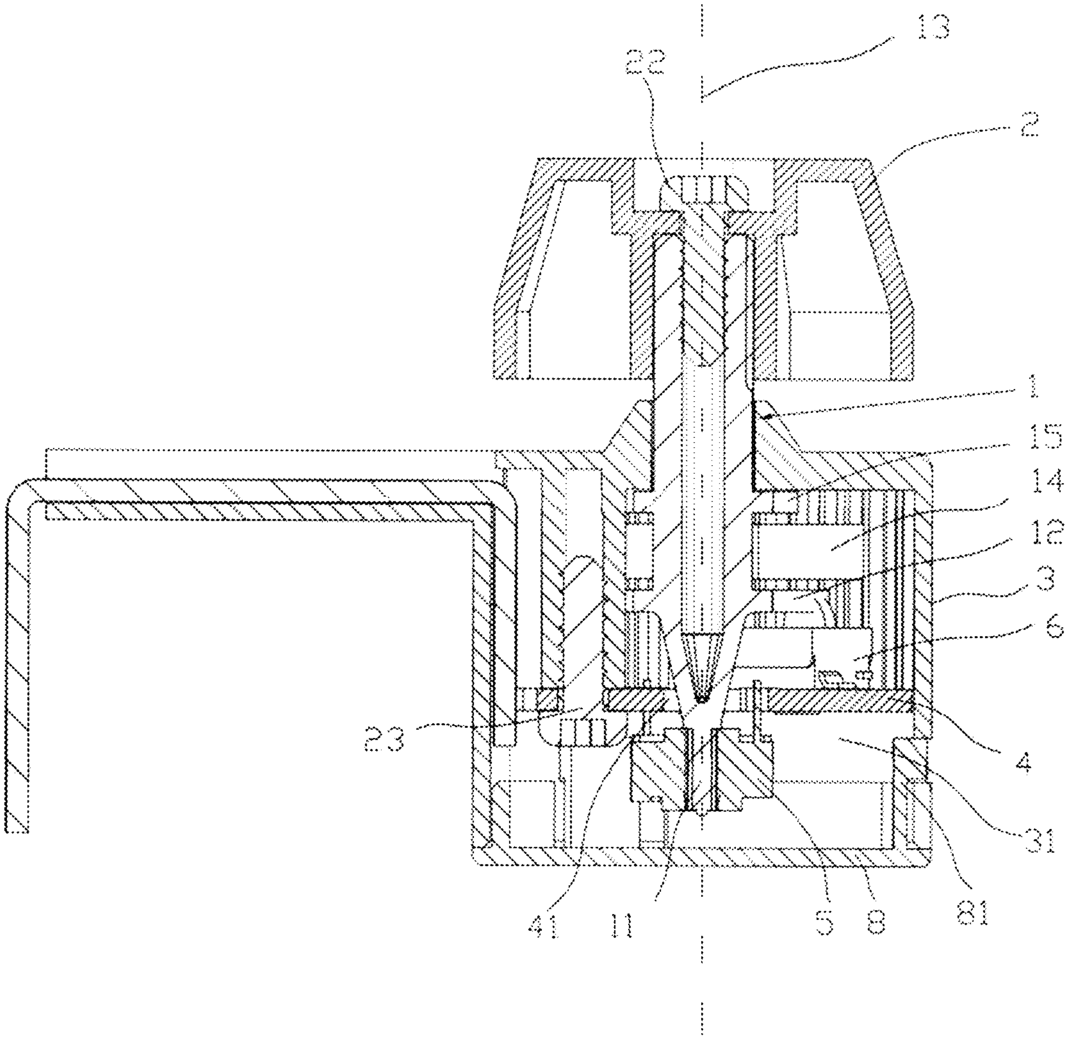
FIG. 3 is the sectional drawing of the power regulating device in FIG. 1.
Figure 4:
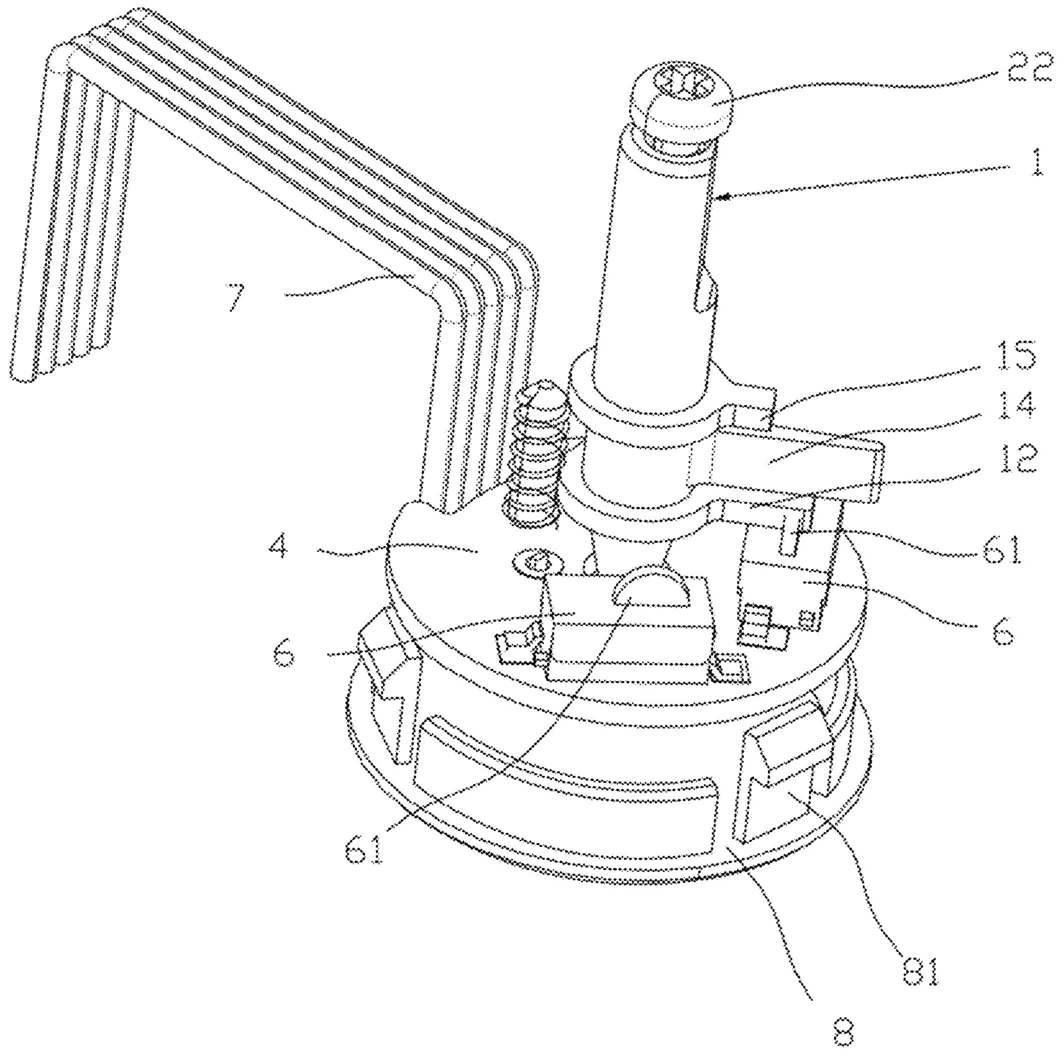
FIG. 4 is a schematic diagram showing the structure of one regulating state of the power regulating device in FIG. 2.
Figure 5:
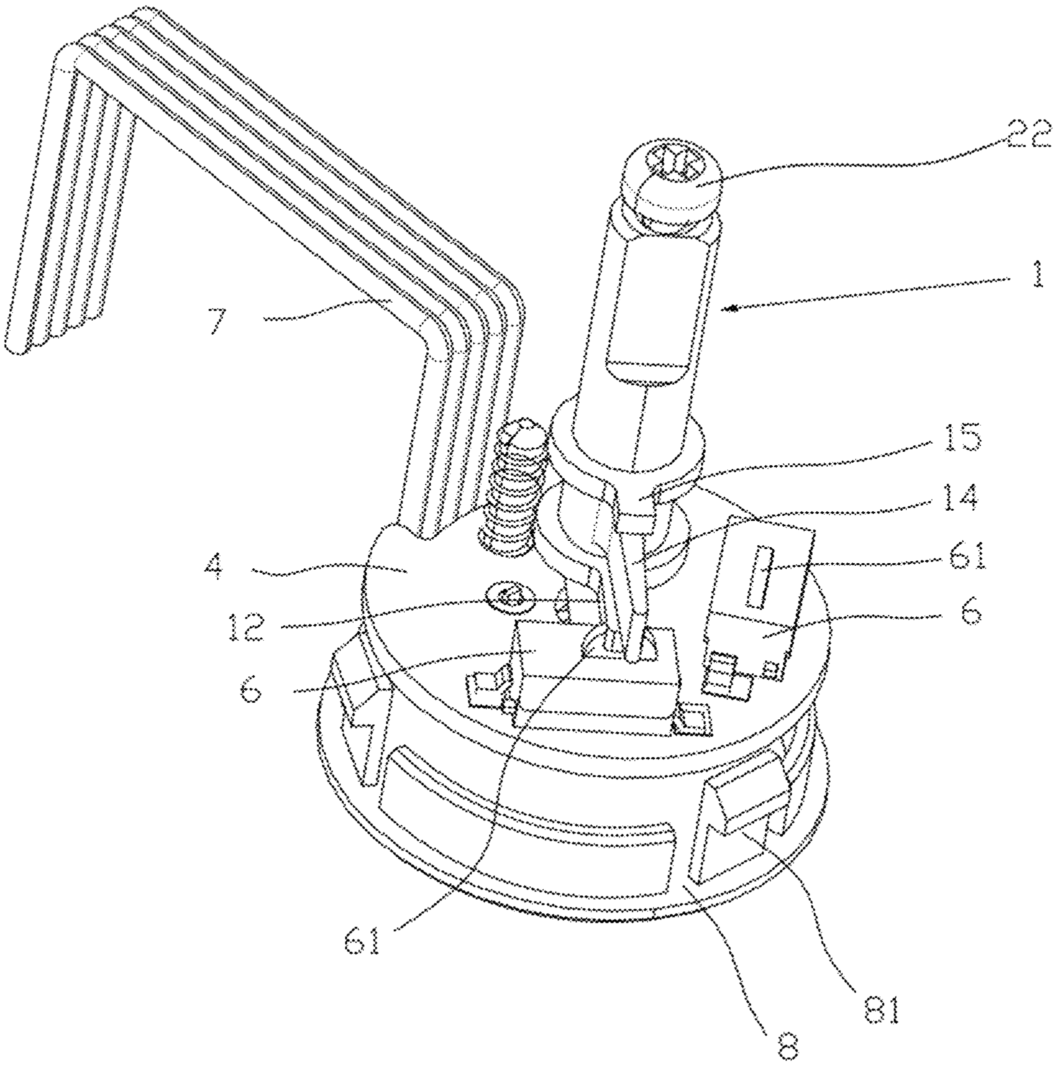
FIG. 5 is a schematic diagram showing the structure of another regulating state of the power regulating device in FIG. 2.
Figure 8:
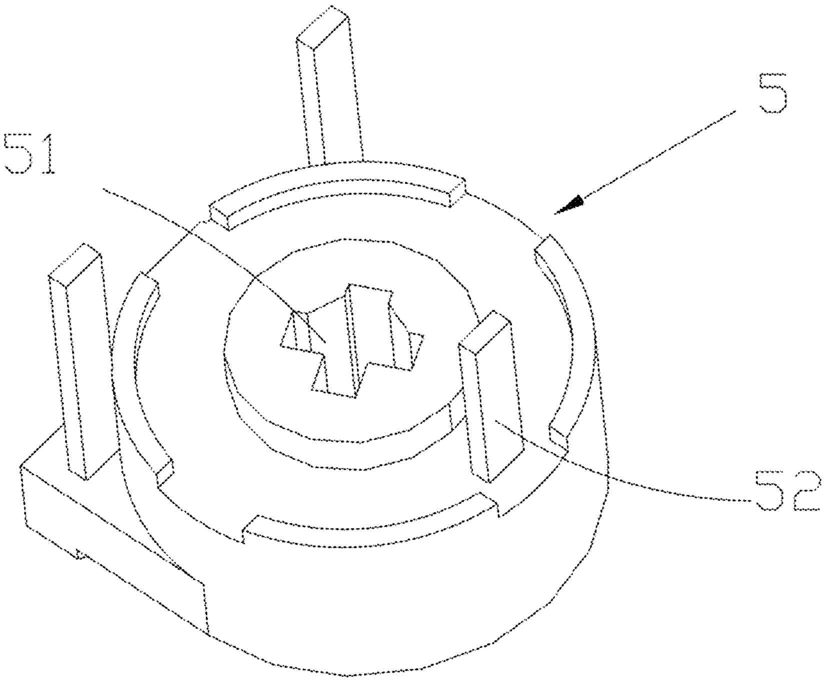
FIG. 8 is a schematic diagram showing the structure of the variable resistance in FIG. 3.
Figure 9:
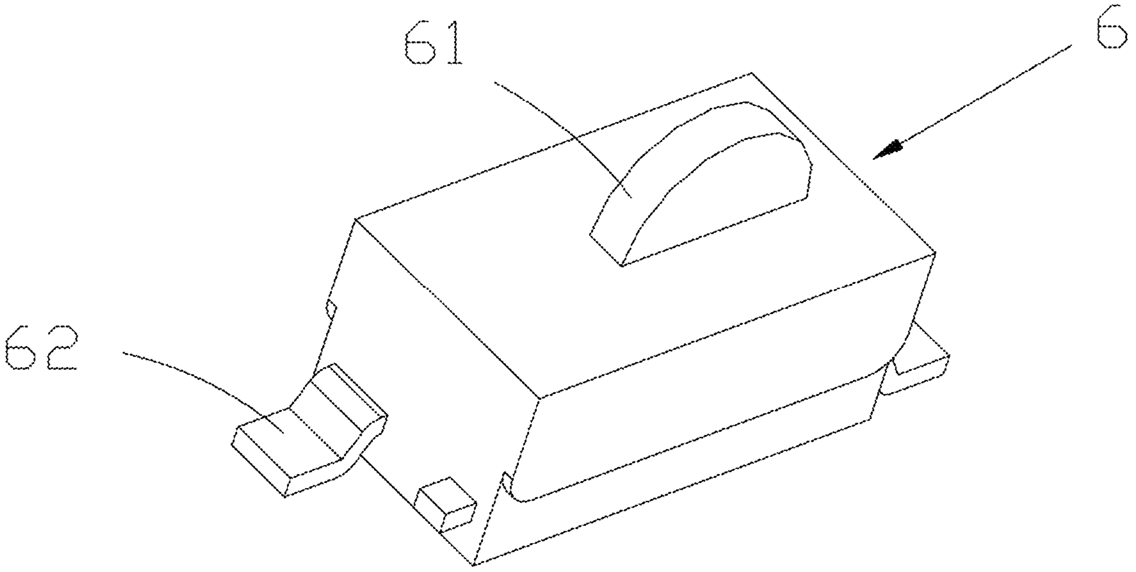
FIG. 9 is a schematic diagram showing the structure of the control switch in FIG. 3.

In one embodiment, as shown in FIG. 3, the regulating part 1 can rotate around the rotating shaft 13 corresponding to mounting base 3. It is defined that the direction of the rotating shaft 13 is the up-down direction, and the direction vertical to the rotating shaft 13 is the horizontal direction. The first regulating section 11 is provided on one end of the regulating part 1 and parallel to or overlapped with the rotating shaft 13, the second regulating section 12 is vertical to the rotating shaft 13; the cross section of the first regulating section 11 is in the "cross" shape (FIG. 8), the insertion slot 51 on the variable resistance 5 is provided as a concave slot with a cross section in the "cross" shape; the first regulating section 11 is inserted into the insertion slot 51, rotation of the first regulating section 11 can drive the variable resistance 5 (knob-type potentiometer) to rotate, so that the resistance value of the variable resistance 5 can be regulated to supply control power supply 9 with continuously changing first control signal and realize continuous dimming.

The control switch 6 comprises the contact 61 flexibly provided on its top and on the moving path of the second regulating section 12, the second regulating section 12 can move along with the rotation of the regulating part 1, the second regulating section 12 can contact the contact 61 during its movement, the contact 61 will move downward when it is extruded by the second regulating section 12, and the control switch 6 will switch from the first state to the second state as a result (from the closed state to the open state, or from the open state to the closed state). The control switch 6 can be normally closed, or normally open and can recover to the first state under the natural state. When the state of the control switch 6 is changed, the second control signal will be sent to the control power supply 9 to realize precise dimming There may be one or multiple control switch(es) 6. When the power regulating device 20 comprises multiple control switches 6 (FIG. 4 and FIG. 5), during rotation of the regulating part 1, the second regulating section 12 can contact each control switch 6 one by one and successively generate multiple second control signals.

Preferentially, the power regulating device also comprises the circuit board 4 provided inside the mounting space, the variable resistance 5 is provided on the lower surface of the circuit board 4, the control switch 6 is provided on the upper surface of the circuit board 4; the circuit board 4 is provided with an avoiding hole 41, the first regulating section 11 passes through the avoiding hole 41 and connects to the variable resistance 5; the structure is more compact. In other embodiments, the variable resistance 5 and the control switch 6 can be flexibly provided in different positions of the circuit board 4. Further, the surface of the mounting base 3 is also provided with a support pillar 35, and the circuit board 4 is fixed onto the support pillar 35 via the second fastener 23.

Figure 10:
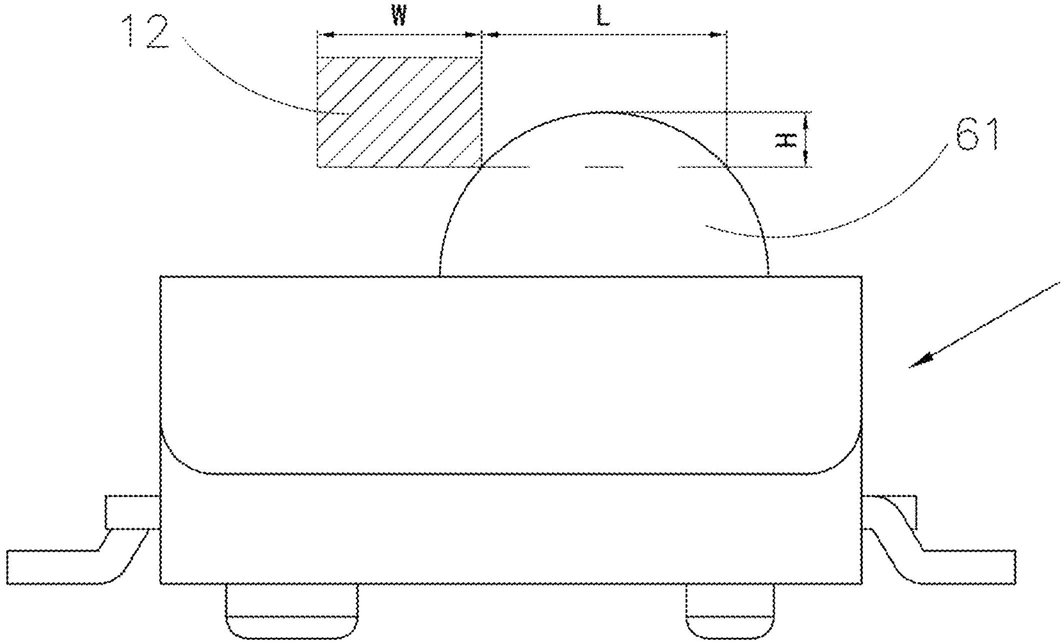
FIG. 10 is a drawing showing the position relationship between the second regulating section and contact in FIG. 4.

As shown in FIG. 10, to ensure that the second regulating section 12 can contact the contact 61 effectively, the height of the bottom of the second regulating section 12 should be lower than the top of the contact 61 to form a height difference H, the effective contact length of the second regulating section 12 and the contact 61 is W, and the effective contact length of the contact 61 and the bottom of the second regulating section 12 is L. The process where the second regulating section 12 rotates to L and W is the effective working stage. When the continuous dimming and the precise dimming are switched, the output power of the power supply will suddenly change from the high power at the critical point of continuous dimming into precise power, or from the lower power at the critical point of the continuous dimming into the precise power, presenting the feeling of transition of brightness and darkness; to reduce the sense of transition of brightness and darkness, the numerical value of W and L should be decreased, so that the numerical value of the high power and the low power of the critical point of continuous dimming can be closer to the precise power to weaken the above obvious transition of brightness and darkness. To decrease the numerical value of W, the effective contact surface at the bottom of the second regulating section 12 can be designed into a taper or other pointed geometric structures; to reduce the numerical value of L, the effective contact top of the contact 61 can be designed into an arc surface or other pointed geometric structures.

As shown in FIG. 4-FIG. 7, the regulating part 1 also comprises the first locating arm 14 vertical to the rotating shaft 13, the lateral surface inside the mounting base 3 corresponding to the first locating arm 14 is provided with several locating slots 32, several locating slots 32 are provided in a annular shape, when the regulating part 1 rotates to one angle, the first locating arm 14 and the locating slots 32 will be of interference fit to restrict the angle of the regulating part 1.

Figure 6:
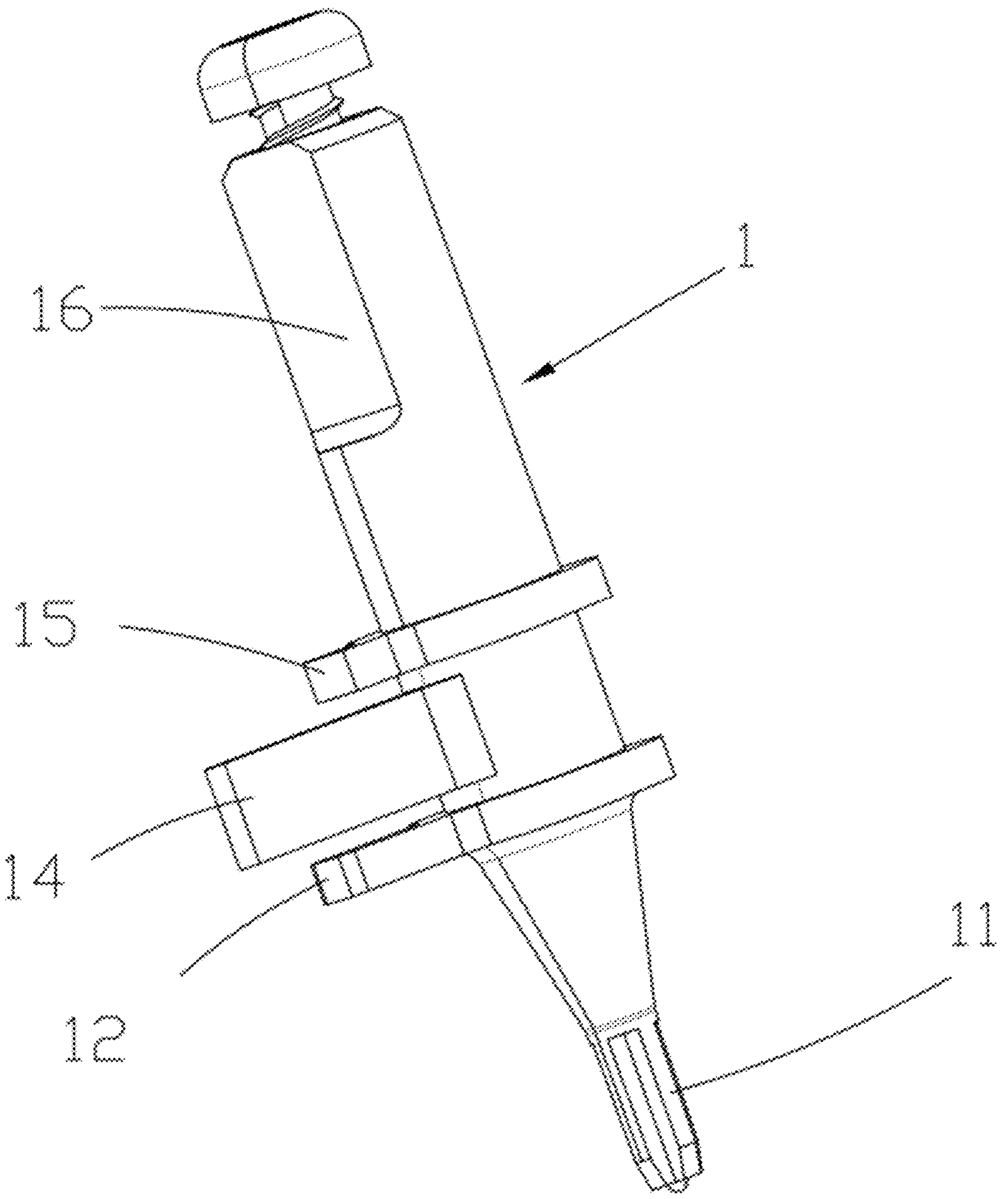
FIG. 6 is a schematic diagram showing the structure of the regulating part in FIG. 2.
Figure 7:
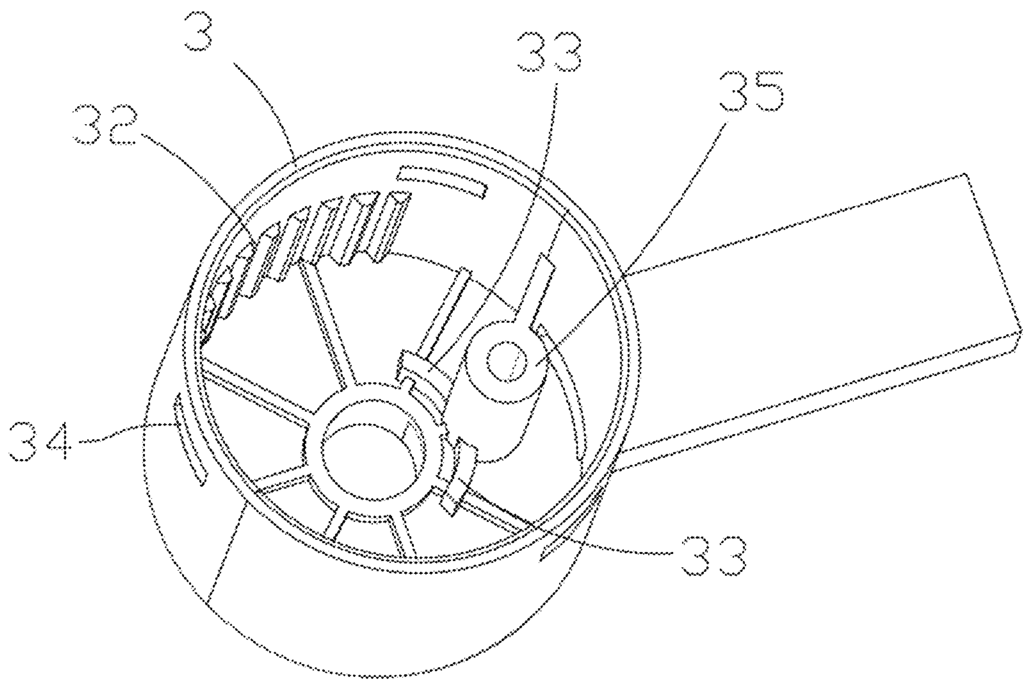
FIG. 7 is a schematic diagram showing the structure of the mounting base in FIG. 2.

To prevent rotation of the regulating part 1 exceeds the extreme power scope of the light, preferentially, as shown in FIG. 6 and FIG. 7, the regulating part 1 also comprises the second locating arm 15 vertical to the rotating shaft 13, the inner surface of the mounting base 3 corresponding to the second locating arm 15 is provided with two locating sections 33, when the regulating part 1 rotates clockwise or counterclockwise to the limiting position, the second locating arm 15 can be against the locating section 33, preventing the regulating part 1 rotating outside the adjustable scope of the light power. The locating section 33 can be provided on the top surface or the lateral surface of the mounting base 3.

Preferentially, the top of the regulating part 1 is provided with a keycap 2; the keycap 2 can rotate or slide to drive corresponding rotation or slide of the regulating part 1; The surface of the mounting base 3 or the light nearby the keycap 2 is provided with a power sign, when the keycap 2 rotates or slides to one position, the indicating section points to the corresponding power sign to improve the operation convenience. As shown in FIG. 3 and FIG. 6, the upper end of the regulating part 1 is provided with a slope 16, when the regulating part 1 is inserted into the mounting hole of the keycap 2, rotation of the regulating part 1 and the keycap 2 around the rotating shaft 13 can be prevented; the first fastener 22 connects to the regulating part 1 and the keycap 2, preventing peeling off of the keycap 2. The second regulating section 12, the first locating arm 14 and the second locating arm 15 are distributed from the bottom to the top and on the same side of the regulating part 1.

Preferentially, the mounting base 3 comprises the bottom cover 8 provided on its bottom; the upper end of the bottom cover 8 is provided with an elastic snap joint 81, the lateral side of the mounting base 3 corresponding to the snap joint 81 is provided with a clamping slot 34, the bottom cover 8 is installed onto the bottom of the mounting base 3 through connection of the snap joint 81 and the clamping slot 34.

By referring to several technical schemes as mentioned above, the present invention can also provide a power regulating device comprising a stroke part, a continuous regulator and a precise regulator. the stroke part can move along the regulating stroke; movement of the stroke part along the regulating stroke drives the continuous regulator to continuously adjust the power in a linear way; the precise regulator comprises one or several precise power triggering point/s on the regulating stroke of the stroke part, so that it can regulate the power to get the corresponding precise power when the stroke part reaches the precise power triggering point.

the stroke comprises the rotation movement path or the linear movement path.

the continuous regulator is used for continuous regulation (stepless dimming) of the output power of the control power supply of the light; it is understood that all the mechanisms that enable continuous regulation of the output power of the control power supply are within the protection scope of the present invention (for example, the continuous regulator can comprises the variable resistance); the continuous regulator can send continuous regulation signals to the control part of the control power supply according to the numerical value of the resistance introduced into the circuit, and the control part of the control power supply of the light receives the continuous regulation signal to regulate the output power.

The precise regulator can regulate the output power of the control power supply of the light into one or several preset constant value/s. It is understood that all the mechanisms that can realize the above functions are within the protection scope of the present invention (for example, the precise regulator can comprises a position sensor). the position sensor can be a proximity sensor, when the position sensor senses that the stroke part moves to the corresponding position, it sends the precise power regulation signal, the control part of the control power supply of the light receives the precise power regulation signal to regulate the output power of the power supply; the precise regulator can comprise a concrete control switch, the stroke part reaches the precise power triggering point to contact the contact of the control switch to switch the first state of the control switch into the second state, the precise power regulation signal is sent, and the control part of the control power supply of the light receives the precise power regulation signal to regulate the output power of the power supply.

As regards the control part of the control power supply of the light, the precise power regulation signal is prior to the continuous regulation signal.

Figure 11:
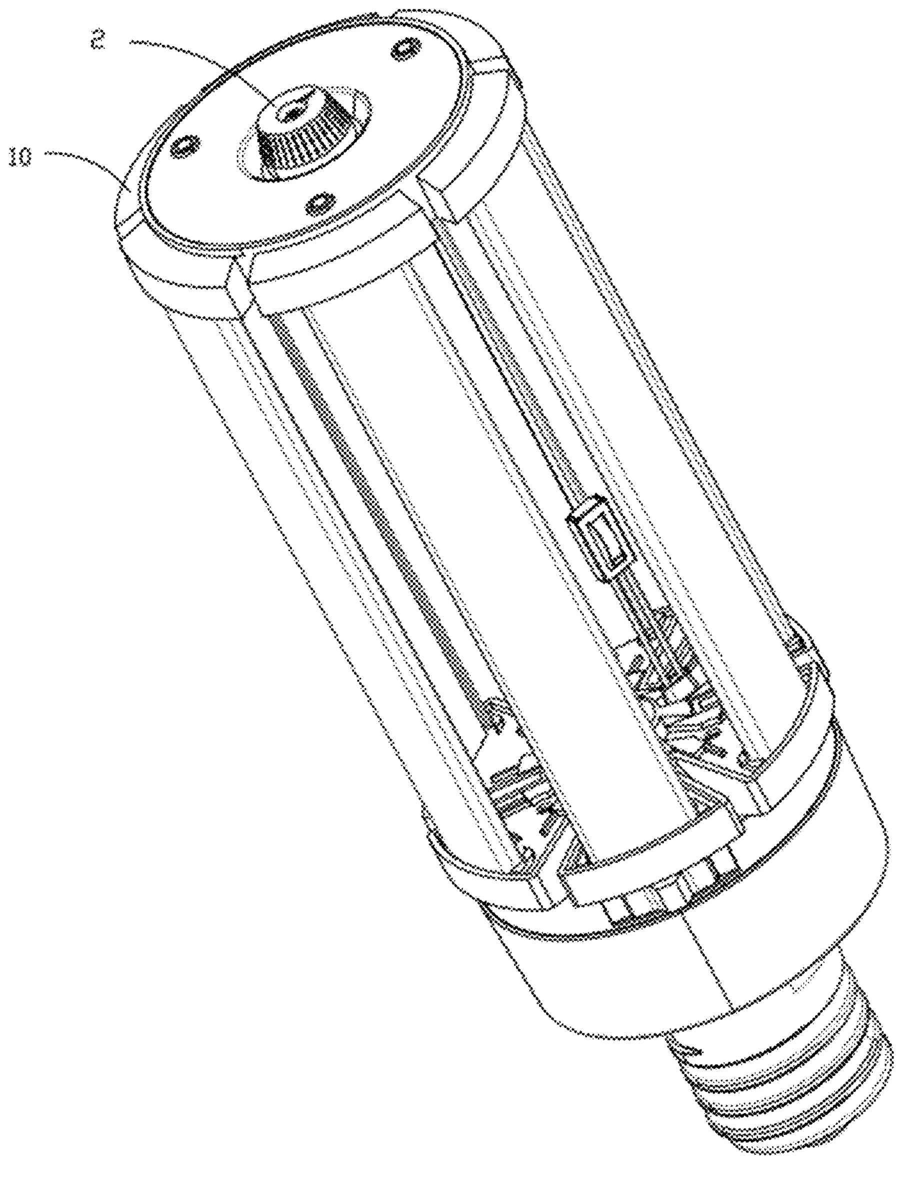
FIG. 11 is a schematic diagram showing the structure of an embodiment of the lamp in the present invention.
Figure 12:
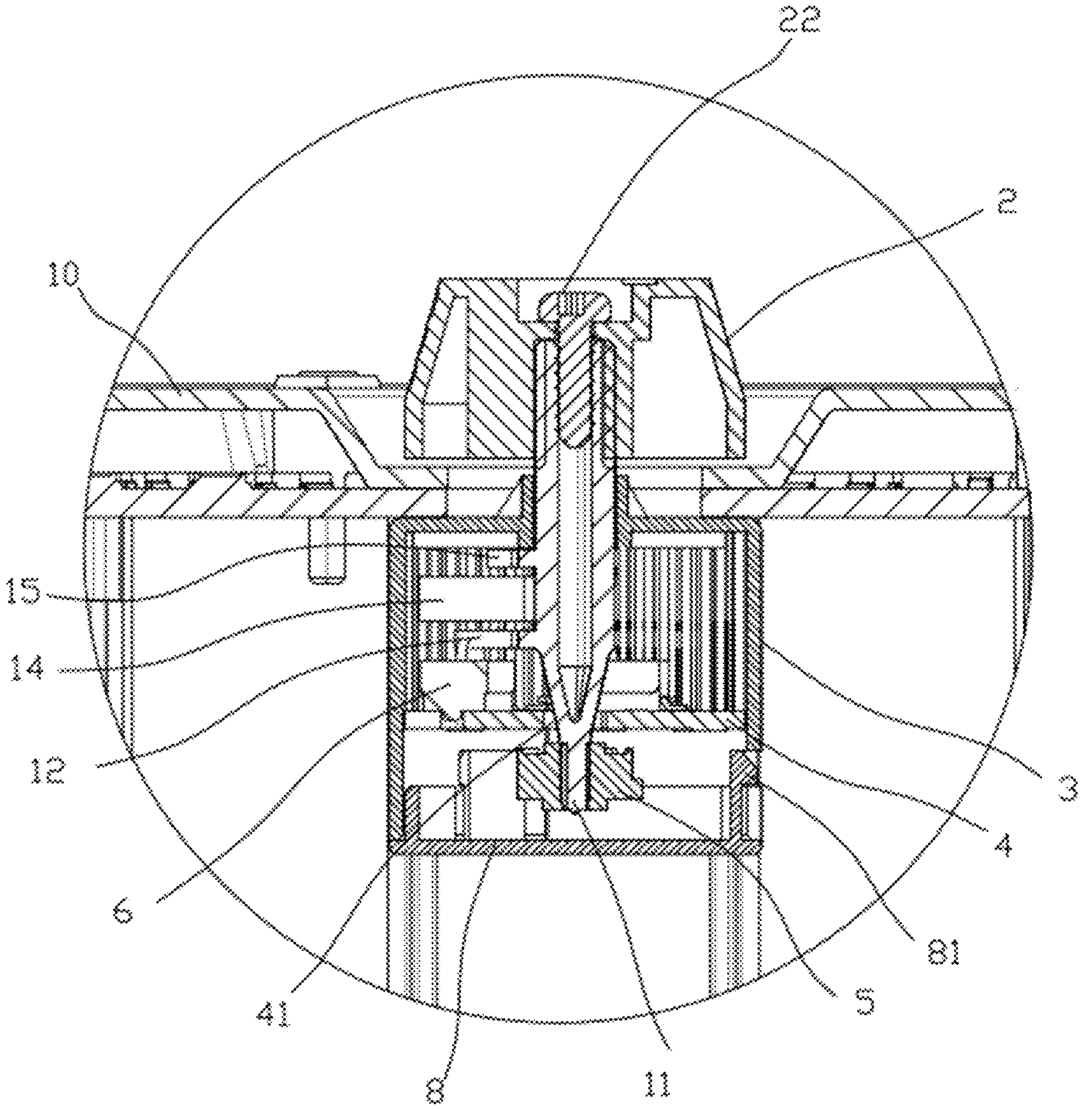
FIG. 12 is a schematic diagram showing the structure of the local section in FIG. 11.
Figure 13:
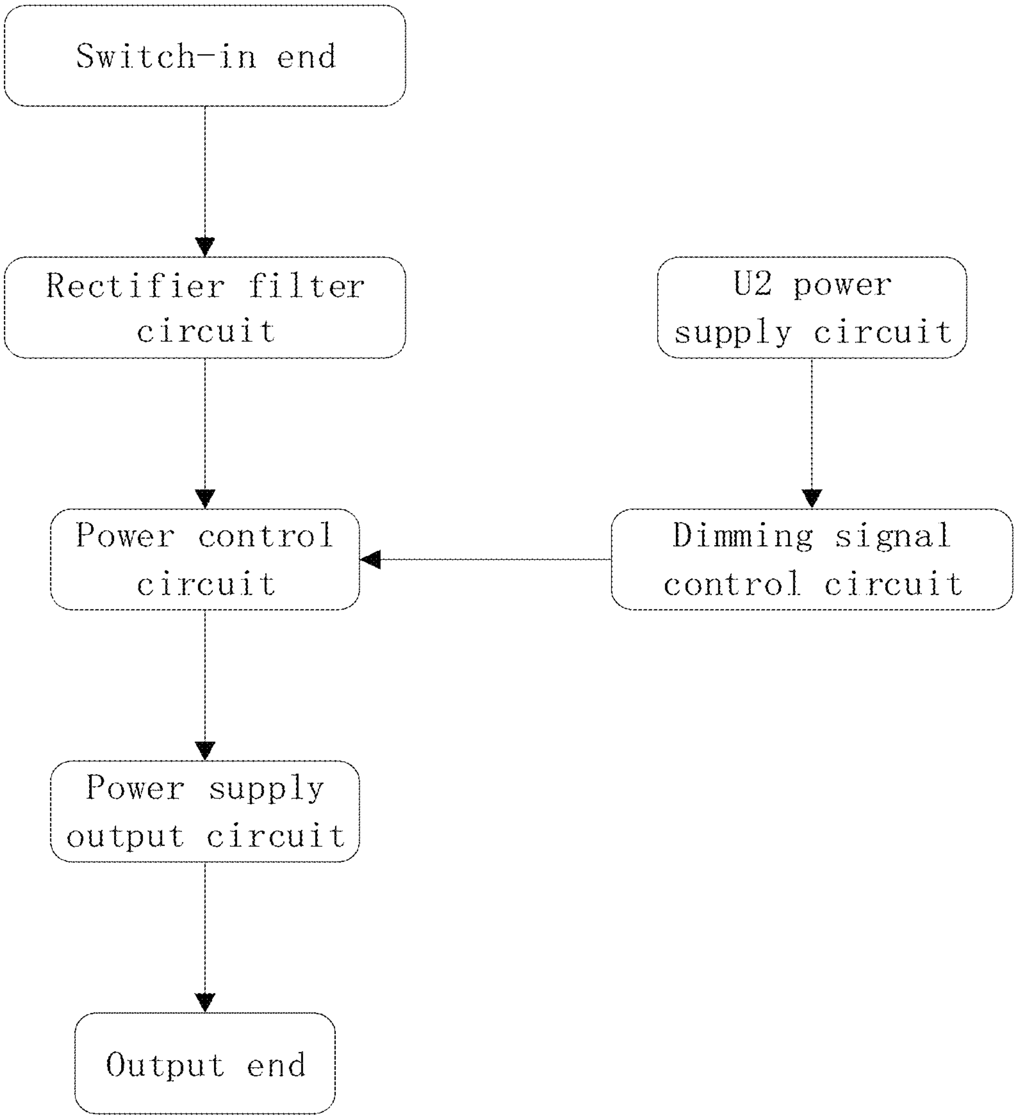
FIG. 13 is one diagram showing control of the light in FIG. 12.

As shown in FIG. 11 and FIG. 12, the present invention also provides a light, comprising a control power supply 9, a power regulating device 20 and the light body 10, the light body 10 is provided with a mounting slot for providing the light power regulation device 20, and the power regulation device 20 is provided in the mounting slot. The power regulating device 20 is provided with a lead wire 7 connecting to the control power supply 9.

In one embodiment, as shown in FIG. 13-19, the control circuit of the control power supply 9 comprises the switch-in end 91, rectifier filter circuit 92, power control circuit 93, power output circuit 94, output end 9, dimming signal control circuit 96 and U2 power supply circuit 97 electrically connected in sequence; wherein, U2 power supply circuit 97 provides working power for dimming signal control circuit 96; the rectifier filter circuit 92 and the power output circuit 94 can be regular circuits; Dimming signal control circuit 96 can be used for receiving the first control signal and the second control signal sent by the power regulating device 20.

Figure 14:
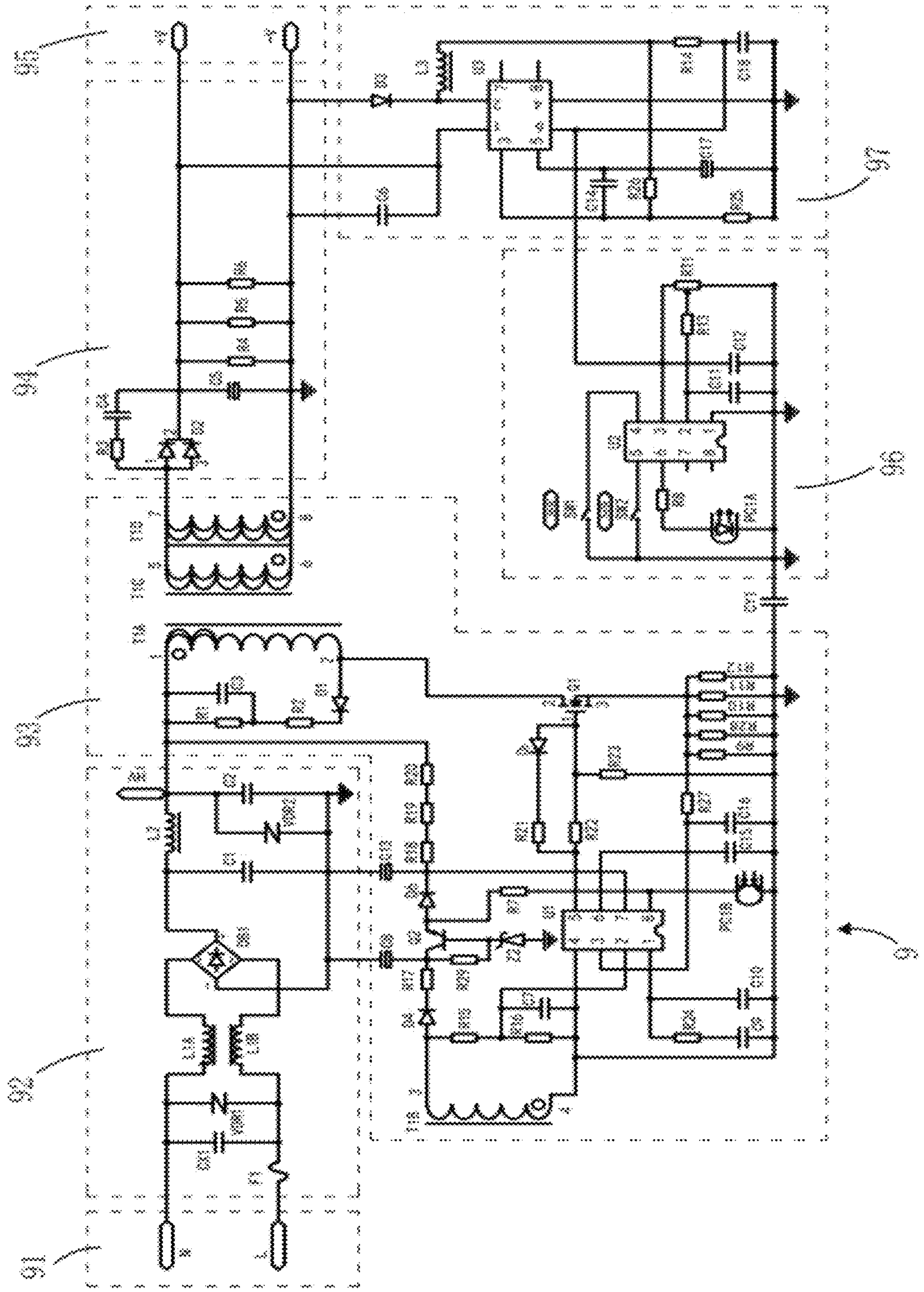
FIG. 14 is one diagram showing the circuit of the light in FIG. 13.
Figure 15:
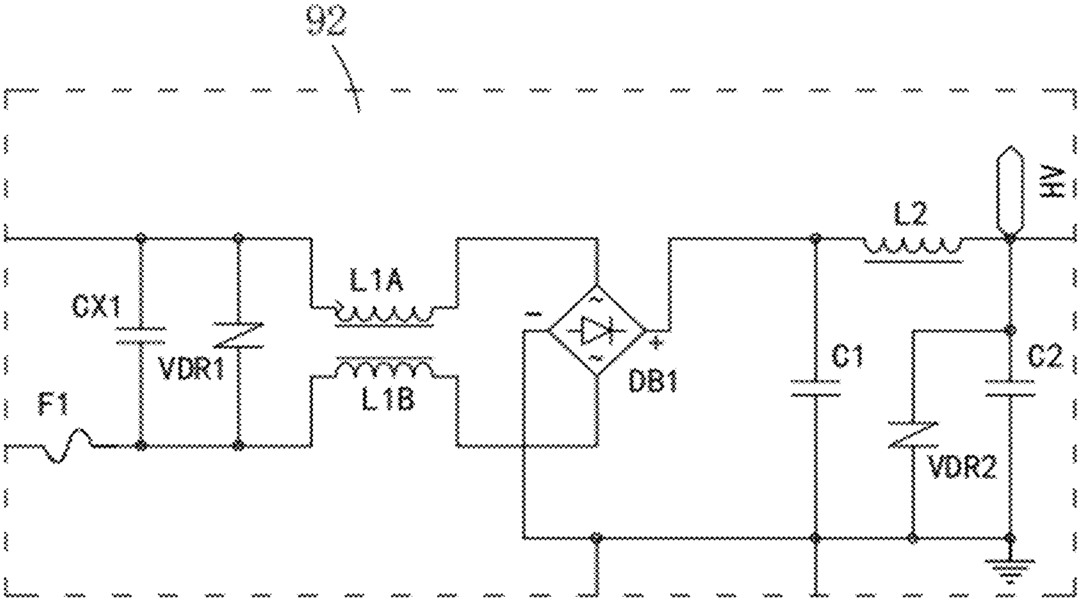
FIG. 15 is one diagram showing the amplification circuit of the rectifier filter circuit in FIG. 14.
Figure 16:
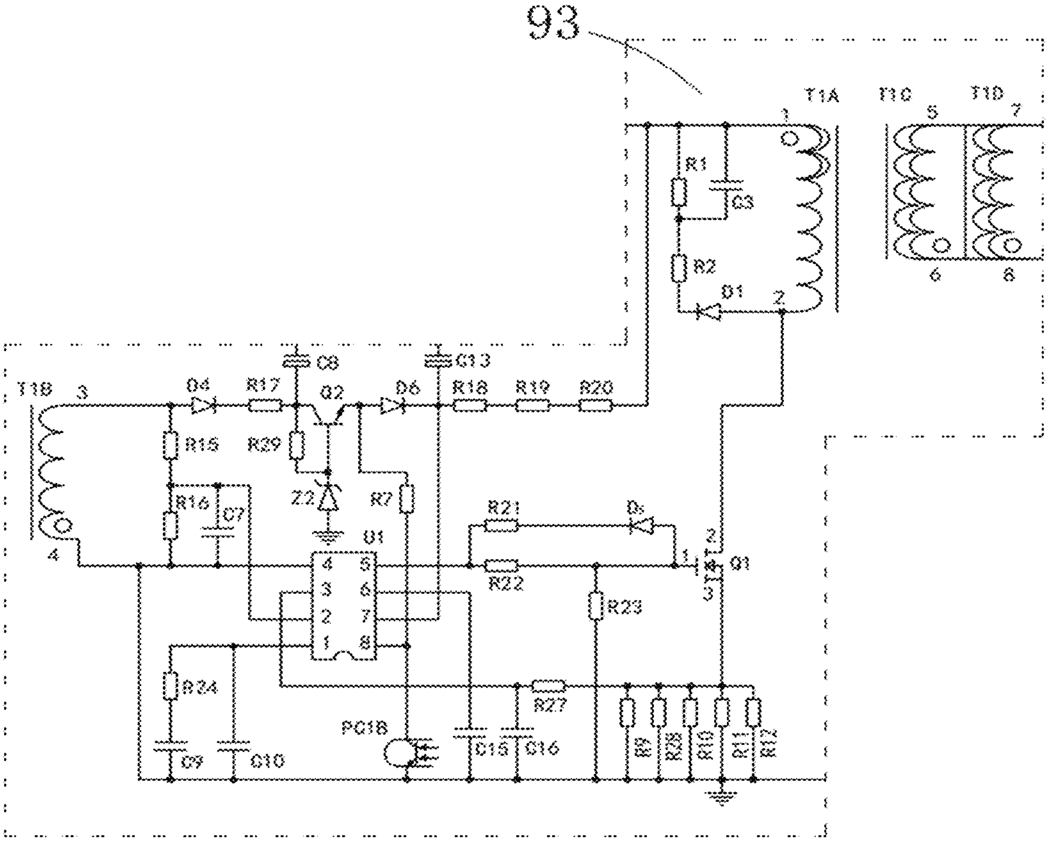
FIG. 16 is one diagram showing the amplification circuit of the power control circuit in FIG. 14.
Figure 17:
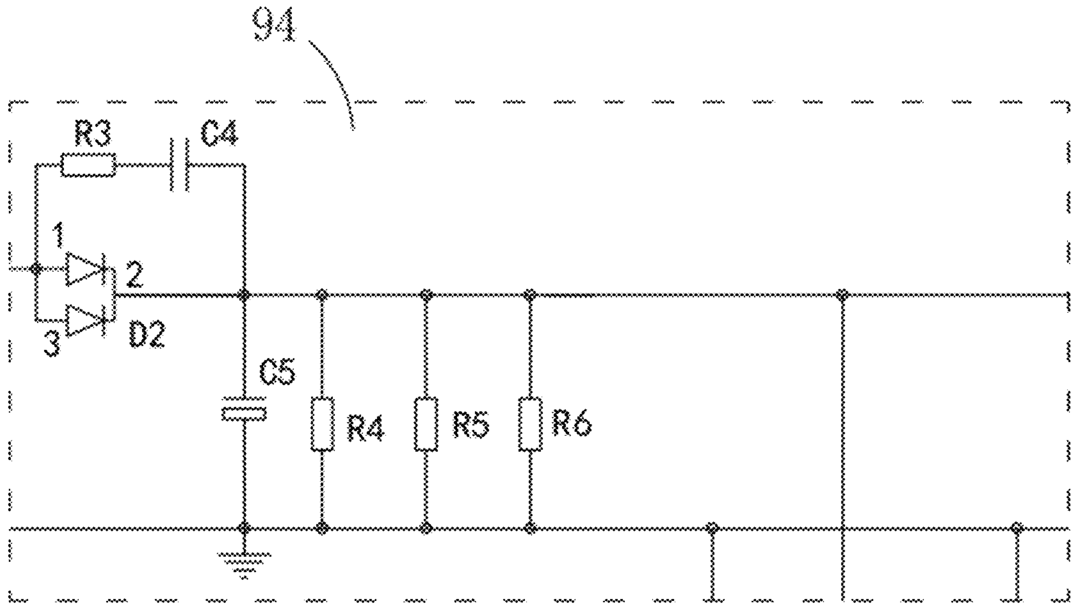
FIG. 17 is one diagram showing the amplification circuit of the power output circuit in FIG. 14.

As shown in FIG. 14, the U2 power supply circuit 97 access power from the power output circuit 94, constant voltage is output from the pin 6 via regulation of the U3 chip and its peripheral circuit, the output voltage in the embodiment is 5V; in other embodiments, U2 power supply circuit 97 can also access power from other places.

Figure 18:
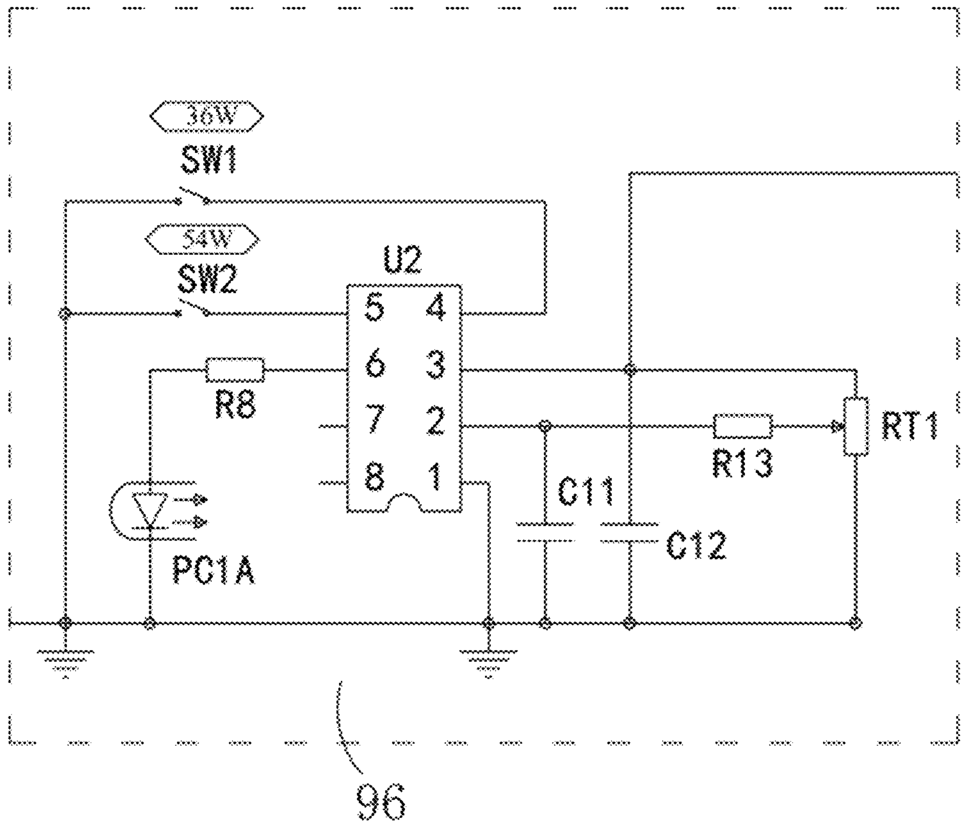
FIG. 18 is one diagram showing the amplification circuit of the dimming signal control circuit in FIG. 14.
Figure 19:
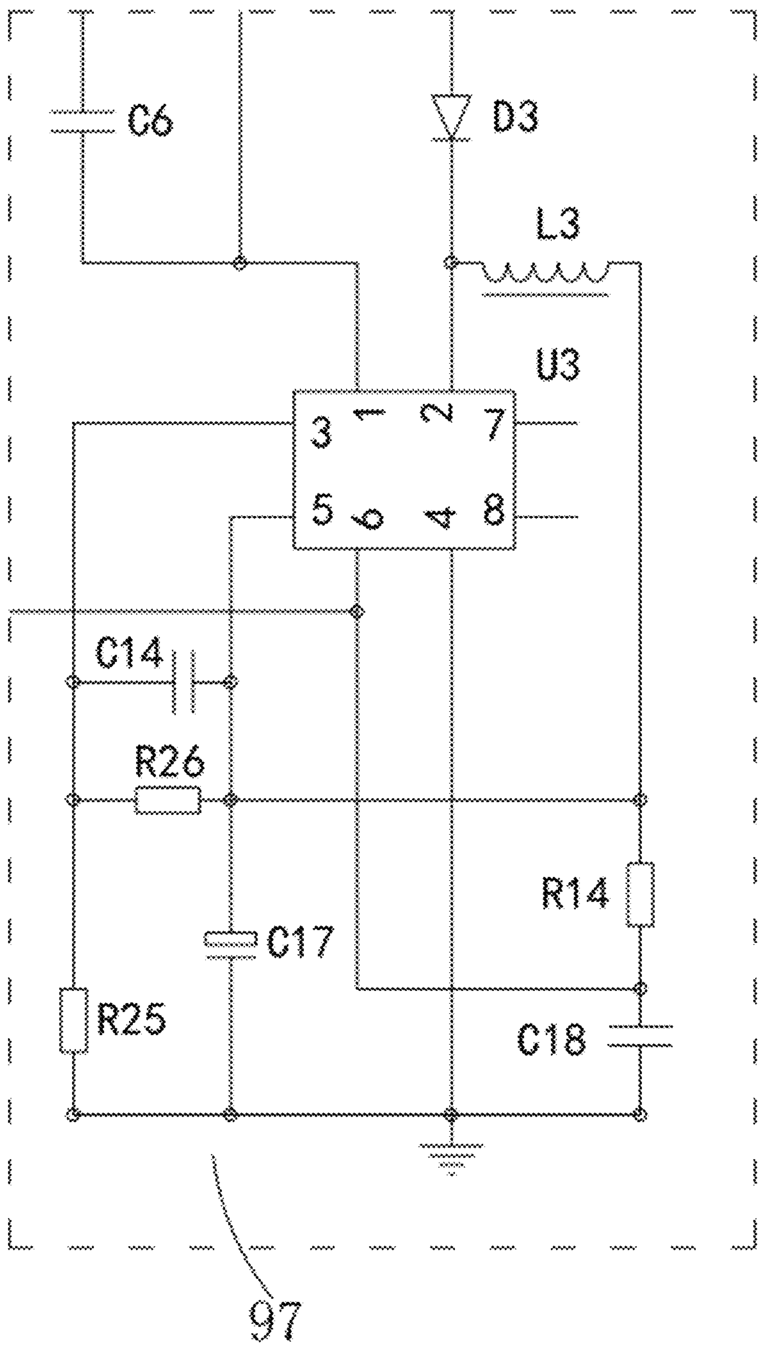
FIG. 19 is one diagram showing the amplification circuit of the U2 power supply circuit in FIG. 14.

As shown in FIG. 14 and FIG. 18, the dimming signal control circuit 96 comprises the sub-control chip U2, variable resistance RT1 (i.e. variable resistance 5) and two control switches SW1 and SW2. one end of variable resistance RT1 connects to the pin 2 of the sub-control chip U2, one end connects to the grounding wire, the other end connects to the constant voltage, under the action of the constant voltage, different resistance values of variable resistance RT1 are converted into different sizes of current signals, so that the chip U2 can identify the size of the first control signal; there is also a resistance R13 between the pin 2 of the chip U2 and the variable resistance RT1 for improving the anti-interference capacity of the circuit and improving the precision of chip U2's recognition of resistance value changes of the variable resistance RT1 to realize higher power regulation precision; one end of two control switches SW1 and SW2 electrically connects to pin 4 and pin 5 of sub-control chip U2 respectively, and the other end connects to the ground. The first control switch SW1 and the second control switch SW2 are corresponding to one triggering point of precise power respectively; the corresponding precise power is set when the second regulating section 12 reaches the precise power triggering point. The resistance value of the variable resistance RT1 changes to send the first control signal to chip U2; when the state of the control switch SW1, SW2 or more control switches is switched, the second control signal is sent to the chip U2. Chip U2 (sub-control chip) can output different internal control signals via pin 6 according to the first control signal from pin 2, one second control signal form pin 4 and another second control signal from pin 5. This internal control signal can be PWM signal that is delivered to the main control chip U1 of power control circuit 93 via the optocoupler (PC1A/PC1B).

The main control chip U1 can be SY5892 constant current control chip supplied by Silergy Semiconductor Technology (Hangzhou) Co., Ltd. Chip U2 (sub-control chip) can be SCM. Priority is given to handing of the second control signal. For example, the control switch SW1 is corresponding to 36 W precise power, and control switch SW2 is corresponding to 54 W precise power; when the state of control switch SW1 is switched, the chip U2 receives the first control signal and the second control signal at the same time, chip U2 only outputs the specific PWM value A corresponding to SW1, enabling power control circuit 93 to output 36 W specific precise power; when the state of control switch SW2 is switched, the chip U2 receives the first control signal and the second control signal at the same time, chip U2 only outputs the specific PWM value B corresponding to SW2, enabling power control circuit 93 to output 54 W specific precise power; when chip U2 only receives the first control signal, chip U2 recognizes the first control signal, outputs the corresponding PWM value C, enables power control circuit 93 to output the corresponding power, and since the first control signal changes continuously, the power output by power control circuit 93 according to the changing first control signal is also continuous. The PWM value A, B and C of the above internal control signals are different and possess different duty ratios ranging from 0 to 100%. Different duty ratios are corresponding to different power output values. Wherein, 100% means the maximum power, and 0% means the minimum power.

The present invention provides a power regulation method of the power regulating device, characterized in that: sub-control chip U2 sends corresponding internal control signals to the main control chip U1 respectively according to change of the resistance value of the variable resistance and switch of the state of the control switch;

The first regulating section 11 is used to regulate the resistance value of the variable resistance 5, the change of the resistance value enables generation of continuously changing first control signal; the second regulating section 12 is used to switch the state of the control switch 6, the switch of the state of the control switch 6 enables generation of the specific second control signal;

The dimming signal control circuit 96 can switch the first control signals and the second control signals into different internal control signals; when the state of the control switch 6 is not switched, the dimming signal control circuit 96 outputs corresponding internal control signals of the power control circuit 93 according to the continuously changing first control signals, enabling the power control circuit 93 to output corresponding continuously changing power; when the state of the control switch 6 is switched, the dimming signal control circuit 96 will send the specific internal control signal to the power control circuit 93 according to the second control signal, so that the power control circuit 93 will output specific precise power.

The above description only presents the preferred embodiments of the present invention, and it is not for this reason that the patent scope of the invention is limited. Any equivalent structural transformation made by using the description of the invention and the drawings, or direct/indirect application in other related technical fields under the inventive concept of the invention, is included in the patent protection scope of the invention.

What is claimed is:

1. A power regulating device for regulating a power supply of a light comprising:

a mounting base provided on the light having a mounting space;

a variable resistance provided inside the mounting space and electrically connected to the power supply of the light;

a control switch provided inside the mounting space and electrically connected to the power supply of the light;

a regulating part, connected to the mounting base in a flexible way having a first regulating section connected to the variable resistance and a second regulating section configured to switch a state of the control switch, when the regulating part rotates or slides relative to the mounting base, either a resistance value of the variable resistance can be changed or the state of the control switch can be switched, when the state of the control switch is switched, the power supply is configured to output a specific power corresponding to the state of the control switch, and when the state of the control switch is not switched, the power supply is configured to output a power corresponding to the resistance value of the variable resistance.

2. The power regulating device as claimed in claim 1, wherein the regulating part further comprises a rotating shaft, the regulating part is configured to rotate relative to the mounting base on the rotating shaft, the first regulating section is provided on one end of the regulating part and is either parallel to or overlaps with the rotating shaft, and the second regulating section is vertical relative to the rotating shaft.

3. The power regulating device as claimed in claim 2, wherein the control switch further comprises a contact that is provided on a top surface of the control switch in a flexible way, the contact is located on a movable path of the second regulating section and is configured to move downward when it is pushed by the second regulating section to switch the state of the control switch and configured to automatically move upward to an original position when not pushed by the second regulating section.

4. The power regulating device as claimed in claim 3, wherein the contact further comprises an arc surface that projects upward and is configured to contact a bottom surface of the second regulating section and slide when the contact is pushed by the second regulating section.

5. The power regulating device as claimed in claim 3, wherein a bottom surface of the second regulating section has either a v shape or an arc structure.

6. The power regulating device as claimed in claim 2, wherein the regulating part further comprises a first locating arm that is vertical relative to the rotating shaft, a lateral surface inside the mounting base corresponding to the first locating arm is provided with multiple locating slots having annular shapes, and, when the regulating part rotates to a particular angle, the first locating arm and the multiple locating slots are configured to lock the regulating part at the particular angle.

7. The power regulating device as claimed in claim 6, wherein the regulating part further comprises a second locating arm that is vertical relative to the rotating shaft, an inner surface of the mounting base corresponding to the second locating arm is provided with two locating sections, when the regulating part rotates to a limiting position, the locating sections will be locked against the second locating arm, thereby preventing further rotation of the regulating part.

8. The power regulating device as claimed in claim 2, wherein the variable resistance is provided with an insertion slot, the first regulating section is inserted into the insertion slot, and the insertion slot is configured to rotate along with the first regulating section to adjust the resistance value.

9. The power regulating device as claimed in claim 1, further comprising:

a plurality of control switches, when the second regulating section is configured to change the state of each control individually.

10. The power regulating device as claimed in claim 1, further comprising:

a circuit board provided inside the mounting space, wherein the control switch is provided on an upper surface of the circuit board.

11. The power regulating device as claimed in claim 10, wherein an inner surface of the mounting base further comprises a support pillar, and the circuit board is fixed onto the support pillar.

12. The power regulating device as claimed in claim 1, further comprising:

a circuit board provided inside the mounting space, wherein the variable resistance is provided on a lower surface of the circuit board, the circuit board is provided with a hole, and the first regulating section extends through the hole to connect to the variable resistance.

13. The power regulating device as claimed in claim 1, wherein an upper side of the regulating part is vertical relative to a top wall of the mounting base and extends to an outer side of the mounting base, a top surface of the regulating part is provided with a keycap, and either rotating or sliding the keycap can drive the regulating part to rotate or slide.

14. The power regulating device as claimed in claim 13, wherein an edge of the keycap is provided with an indicating section, the surface of the mounting base or the light near the keycap further comprises a power indicator, and the indicating section is configured to point to the power indicator by rotating or sliding the keycap.

15. A light comprising:

a power supply;

a light body; and a power regulating device comprising:

a mounting base provided on the light body, a variable resistance provided inside the mounting space and electrically connected to the power supply of the light, a variable resistance provided inside the mounting space and electrically connected to the power supply of the light, a control switch provided inside the mounting space and electrically connected to the power supply of the light, and a regulating part, connected to the mounting base in a flexible way having a first regulating section connected to the variable resistance and a second regulating section configured to switch a state of the control switch, when the regulating part rotates or slides relative to the mounting base, either a resistance value of the variable resistance can be changed or the state of the control switch can be switched, when the state of the control switch is switched, the power supply is configured to output a specific power corresponding to the state of the control switch, and when the state of the control switch is not switched, the power supply is configured to output a power corresponding to the resistance value of the variable resistance.

16. The light as claimed in claim 15, wherein the power supply further comprises a dimming signal control circuit and a power control circuit, the resistance value of the variable resistance changes to generate first control signals, the state of the control switch is switched to generate second control signals, the dimming signal control circuit is configured to output the first control signals and the second control signals as different internal control signals, when the state of the control switch is not switched, the dimming signal control circuit is configured to output the internal control signals according to the first control signals, enabling the power control circuit to output continuously changing power, when the state of the control switch is switched, the dimming signal control circuit is configured to output the internal control signals according to the second control signals, enabling the power control circuit to output a specific power value.

17. The light as claimed in claim 16, wherein the internal control signal is a pulse width modulation (PWM) signal, and the power control circuit is configured to output power according to a specific duty ratio of the PWM signal.

18. The light as claimed in claim 16, wherein the power supply further comprises a U2 power supply circuit that is configured to supply a constant voltage to the dimming signal control circuit, the dimming signal control circuit further comprises a sub-control chip, a second variable resistance and a second control switch, the second control switch and the second variable resistance are configured to respectively connect to different pins of the sub-control chip,; one end of the second control switch is configured to connect connects to pins of the sub-control chip, while another end is configured to connect to a grounding wire, one end of the variable resistance is configured to connect to the pins of the sub-control chip, while another end is configured to connect to a constant voltage, based on the constant voltage, different resistance values of the variable resistance can be converted into different current values, the sub-control chip is configured to switch the current values of the variable resistance according to the state of the control switch to output corresponding PWM signals.

* * * * *